United States Patent
Belling et al.

(10) Patent No.: US 8,688,551 B2
(45) Date of Patent: Apr. 1, 2014

(54) CHARGING CONTROL PROVIDING CORRECTION OF CHARGING CONTROL INFORMATION

(75) Inventors: Thomas Belling, Erding (DE); Mirko Schramm, Berlin (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/126,498

(22) PCT Filed: Nov. 3, 2008

(86) PCT No.: PCT/EP2008/064887
§ 371 (c)(1),
(2), (4) Date: Jun. 10, 2011

(87) PCT Pub. No.: WO2010/060457
PCT Pub. Date: Jun. 3, 2010

(65) Prior Publication Data
US 2011/0238547 A1    Sep. 29, 2011

(51) Int. Cl.
*G07F 19/00* (2006.01)
*H04M 15/00* (2006.01)

(52) U.S. Cl.
USPC .......................................... 705/34; 379/114.01

(58) Field of Classification Search
None
See application file for complete search history.

(56) References Cited

U.S. PATENT DOCUMENTS

| | | | |
|---|---|---|---|
| 7,684,551 B2 * | 3/2010 | Salonen et al. | 379/114.2 |
| 2005/0021351 A1 * | 1/2005 | Koskinen et al. | 705/1 |

FOREIGN PATENT DOCUMENTS

| | | |
|---|---|---|
| CN | 1848897 A | 10/2006 |
| CN | 1996860 A | 7/2007 |
| CN | 101127609 A | 2/2008 |

OTHER PUBLICATIONS

3GPP TSG SA WG2 Meeting #66, TD S2-084752, "IMS session setup with UE initiated resource reservation", Nokia Siemens Networks, Nokia, Montreal, Canada, Jun. 23-27, 2008, 3 pgs.
ETSI TS 129 213 V7.5.0 (3GPP TS 29.213 V7.5.0 Release 7) Digital cellular telecommunications system (Phase 2+); Universal Mobile Telecommunications System (UMTS); Policy and charging control signaling flows and Quality of Service (QoS) parameter mapping (65 pages).

* cited by examiner

*Primary Examiner* — Luna Champagne
(74) *Attorney, Agent, or Firm* — Harrington & Smith

(57) ABSTRACT

There is proposed a charging control in which a policy and charging control function provides first (preliminary) charging control information, such as PCC rules, when the communication connection is set up or modified. Then, service information can be retrieved leading to an updated set of charging control information. The policy and charging control function provides then the updated charging control information for enforcement, wherein the charging system is informed about both the preliminary nature of the first charging control information and the validity of the second charging control information for a time before the update, i.e. before the transmission of the second charging control information. The charging system can use this updated charging control information and knows that it has to replace the former charging control information, so that the charging procedure can be corrected accordingly. Thus, charging of a service miming on the communication connection on the basis of correct charging control information is possible over the complete time the service is running.

16 Claims, 4 Drawing Sheets

CHARGING CONTROL PROVIDING CORRECTION OF CHARGING CONTROL INFORMATION

BACKGROUND OF THE INVENTION

1. Field of the invention

The present invention relates to charging control for a user service running on a communication connection. In particular, the present invention relates to a mechanism for correcting charging control information used for the charging control.

2. Related Prior Art

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMax), took place all over the world. Various organizations, such as the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards for telecommunication network and access environments.

In order to bill services used by a subscriber or user, a policy and charging control (PCC) can be implemented in communication systems. Such PCC architectures are specified in several specifications, for example by 3GPP, as known by those skilled in the art. PCC enables a service specific charging and policing of services. It may encompass different high level functions for IP Connectivity Access Networks (IP-CAN, e.g. GPRS, I-WLAN, Fixed Broadband, etc.), such as Flow Based Charging, including charging control and online credit control, and policy control (e.g. gating control, Quality of Service (QoS) control, etc.).

In a PCC network architecture, such as one based on 3GPP specifications, for example, a policy and charging rules function (PCRF) provides a policy and charging enforcement function (PCEF) with so-called policy and charging control rules (PCC rules). Media sent or received by a user equipment (UE) are transferred via the IP-CAN and through the PCEF which controls the related IP CAN connections. For charging purposes, the PCEF also collects information which is forwarded as charging records to, for example, an offline charging system (OFCS), and/or manages credits received from an online charging subsystem (OCS). The PCRF may derive PCC rules from information about ongoing services that is provisioned by so-called application function(s) (AF) towards the PCRF. In addition, the PCRF may provide PCC rules not related to any services provisioned by an AF.

It is to be noted that in case services are provisioned by an IP Multimedia subsystem (IMS), a so-called Proxy Call Session Control Function (P-CSCF) may act as an AF.

It is possible that different charging rates are applied. For example, applicable charging rates may differ between AF controlled services and other services. For instance, services provided by the IMS may be set free of charge in the PCC, for example since charging may be performed by non-PCC related entities. On the other hand, non-IMS related services may be charged by PCC.

When the UE requests a set up or modification of an IP CAN connection, the PCEF informs the PCRF about this request. Furthermore, the PCEF may request PCC rules. However, there might be situations where the PCRF is not able at this point in time to answer in a way that all possible usages of the IP-CAN session are authorized, i.e. to decide whether the UE request belongs to a service which is AF controlled or not. This may occur, for example, when the related AF has not yet provisioned the corresponding service information.

For illustrating such a situation, the following example may be considered. For instance, there may be a problem in case of an UE-initiated bearer setup at the terminating side of an IMS-controlled call setup, if resources at the originating side are already available. Here, the UE may set up a bearer before an SDP answer is sent, while service information may be provisioned from the P-CSCF to the PCRF only when an SDP answer is available in SIP signalling. Thus, a wrong charging of services may result during the time until service information becomes available from the AF.

However, according to the signalling protocol applied on, for example, a Gx interface between the PCRF and the PCEF, updates to PCC rules apply only from the point in the time onwards when they are provisioned to the PORE. Such PCC rule updates are typically used to support changes in the charging that take affect at this point in time, for example in case the rate for a service depends on the time of day when the service is used.

Consequently, a charging related PCC rule update is only relevant from the point in time onwards. Therefore, it would not be possible to charge a service correctly before the time the relevant service information are available, i.e., for example, before the AF provides the service information and the PCRF updates the PCC rules.

In other words, a policy and charging control unit, such as a PCRF, is not able to trigger the charging systems to correct charging control information relating to a point in time prior to an update of a PCC rule, i.e. for the period in time between the PCC rule activation and the charging related PCC rule update.

There are several approaches conceivable for dealing with such a situation. For example, one possible solution to avoid overcharging while the type of service is still unknown is allowing a service free of charge for a timer-supervised period. However, a timer in the order of, for example, up to 30 seconds may be required to cope with call flows encountered in IMS, and a considerable loss of income and fraud potential may render this solution inacceptable for an operator.

It has also been suggested to block service flows at the PCEF for the timer-supervised period to avoid fraud. However, this may severely impact the user experience in particular for non-IMS services such as Web browsing.

Another solution may be a modification of P-CSCF procedures to provide service information derived from the SDP offer. However, this service information will not contain all IP address and port information and may thus not be sufficient to "bind" it with traffic flow templates (TFTs) received for the IP CAN. Thus, the PCRF may not be able to unambiguously identify services even with this amendment. Further, UEs may set up or modify bearers for a service prior to sending any related SIP signalling and SDP. This behaviour can be expected for instance from a 3GPP2 UE starting a call setup. For such a scenario, such an approach would also not provide a proper solution.

SUMMARY OF THE INVENTION

Thus, it is an object of the invention to provide an improved charging control where a correct billing of a user service is ensured. In particular, it is an object of the invention to provide methods and apparatuses which allow a later correction of accounting information gathered for a service so as to enable a correct charging of the whole session.

This object is achieved by the measures defined in the attached claims.

In particular, according to one aspect of the proposed solution, there is provided, for example, an apparatus comprising a receiver configured to receive a request for charging control information for a service running on a communication connection, a processor configured to provide a first set of charging control information, wherein an indication is provided indicating that the first set of charging control information is preliminary, a receiver configured to receive a service information regarding the service running on a communication connection, and a processor configured to adjust charging control information in accordance with the service information received, and to provide a second set of charging control information, wherein an indication is provided indicating that the second set of charging control information is valid for the time before the provision of the second set of charging control information.

Furthermore, according to one aspect of the proposed solution, there is provided, for example, a method comprising receiving a request for charging control information for a service running on a communication connection, providing a first set of charging control information, wherein an indication is provided indicating that the first set of charging control information is preliminary, receiving a service information regarding the service running on a communication connection, and adjusting charging control information in accordance with the service information received, and providing a second set of charging control information, wherein an indication is provided indicating that the second set of charging control information is valid for the time before the provision of the second set of charging control information.

According to further refinements, the proposed solution according to the above two aspects may comprise one or more of the following features:

- a check may be made for which services a user of the communication connection is allowed, wherein the first set of charging control information may be based on the result of the check;
- charging control information may comprise at least one policy and charging rule;
- the indication that the first set of charging control information is preliminary may indicate which parts of the charging control information are preliminary;
- from the received service information, a type of service of the communication connection may be determined, wherein the service information may be received from an application function;
- the indication that the second set of charging control information is valid for the time before the provision of the second set of charging control information may indicate that the second set of charging control information is valid for a time before and after the provision of the second set of charging control information, or valid only for a time before the provision of the second set of charging control information;
- the indication that the first set of charging control information is preliminary may be encoded with a dedicated value included in the first set of charging control information;
- at least one of the indication that the first set of charging control information is preliminary and that the second set of charging control information is valid for the time before the provision of the second set of charging control information may be encoded by using an attribute value pair of an enumerated type for indicating at least one of that an update of the set of charging control information refers both to the period of time prior to the update and the period of time after the update, that an update of the charging control information only refers to a period of time after the update, and that an update or provisioning of information within the charging control information is preliminary;
- a dedicated charging key and/or service identifier may be applied for charging control information; additionally, the dedicated charging key and/or service identifier may be applied for the indication that the charging control information is preliminary;
- the apparatus or method may be implemented in a policy and charging functionality.

In addition, according to one aspect of the proposed solution, there is provided, for example, an apparatus comprising a transmitter configured to transmit a request for charging control information for a communication connection, a receiver configured to receive a first set of charging control information, wherein an indication is provided in the first set of charging control information indicating that the first set of charging control information is preliminary, and a second set of charging control information, wherein an indication is provided indicating that the second set of charging control information is valid for the time before the provision of the second set of charging control information, a processor configured to process the received set of charging control information and to enforce corresponding charging rules for the service running on a communication connection.

Furthermore, according to one aspect of the proposed solution, there is provided, for example, a method comprising transmitting a request for charging control information for a communication connection, receiving a first set of charging control information, wherein an indication is provided in the first set of charging control information indicating that the first set of charging control information is preliminary, and a second set of charging control information, wherein an indication is provided indicating that the second set of charging control information is valid for the time before the provision of the second set of charging control information, and processing the received set of charging control information and enforcing corresponding charging rules for the communication connection.

According to further refinements, the proposed solution according to the above two aspects may comprise one or more of the following features:

- an information regarding the received set of charging control information may be transmitted to a charging subsystem, wherein the information may indicate at least one of that the set of charging control information is preliminary or that the set of charging control information is valid for the time before the provision of the second set of charging control information;

at least one of a request for a termination of an old accounting and a start a new accounting may be transmitted by providing a predetermined charging detail records, and a request for a new credit;

the charging control information may comprise at least one policy and charging rule;

the indication that the first set of charging control information is preliminary may indicate which parts of the charging control information are preliminary;

the indication that the second set of charging control information is valid for the time before the provision of the second set of charging control information may indicate that the second set of charging control information is valid for a time before and after the provision of the second set of charging control information, or valid only for a time before the provision of the second set of charging control information;

the indication that the first set of charging control information is preliminary may be encoded with a dedicated value included in the first set of charging control information;

at least one of the indication that the first set of charging control information is preliminary and that the second set of charging control information is valid for the time before the provision of the second set of charging control information may be encoded by using an attribute value pair of an enumerated type for indicating at least one of that an update of the set of charging control information refers both to the period of time prior to the update and the period of time after the update, that an update of the charging control information only refers to a period of time after the update, and that an update or provisioning of information within the charging control information is preliminary;

a dedicated charging key and/or service identifier may be applied for charging control information; additionally, the dedicated charging key and/or service identifier may be applied for the indication that the charging control information is preliminary;

the apparatus or method may be implemented in a policy and charging enforcement functionality of a gateway network element.

In addition, according to one aspect of the proposed solution, there is provided, for example, an apparatus comprising a receiver configured to receive a first set of charging control information, wherein an indication is provided in the first set of charging control information indicating that the first set of charging control information is preliminary, and a second set of charging control information, wherein an indication is provided indicating that the second set of charging control information is valid for the time before the provision of the second set of charging control information, a processor configured to process the received set of charging control information and to effect a charging procedure for charging a service running on a communication connection corresponding to charging rules for the service, wherein a recalculation related to accounting information on the basis of the second set of charging control information is effected for a time before the second set of charging control information is received.

Furthermore, according to one aspect of the proposed solution, there is provided, for example, a method comprising receiving a first set of charging control information, wherein an indication is provided in the first set of charging control information indicating that the first set of charging control information is preliminary, and a second set of charging control information, wherein an indication is provided indicating that the second set of charging control information is valid for the time before the provision of the second set of charging control information, processing the received set of charging control information and effecting a charging procedure for charging a service running on a communication connection corresponding to charging rules for the communication connection, wherein a recalculation related to accounting information on the basis of the second set of charging control information is effected for a time before the second set of charging control information is received.

According to further refinements, the proposed solution according to the above two aspects may comprise one or more of the following features:

at least one of a request for a termination of an old accounting and a start of a new accounting, wherein a predetermined charging detail records may be identified, and a request for a new credit may be received;

the charging control information may comprise at least one policy and charging rule;

the indication that the first set of charging control information is preliminary may indicate which parts of the charging control information are preliminary;

the indication that the second set of charging control information is valid for the time before the provision of the second set of charging control information may indicate that the second set of charging control information is valid for a time before and after the provision of the second set of charging control information, or valid only for a time before the provision of the second set of charging control information;

the indication that the first set of charging control information is preliminary may be encoded with a dedicated value included in the first set of charging control information;

at least one of the indication that the first set of charging control information is preliminary and that the second set of charging control information is valid for the time before the provision of the second set of charging control information may be recognized by means of an encoded information using an attribute value pair of an enumerated type for indicating at least one of that an update of the set of charging control information refers both to the period of time prior to the update and the period of time after the update, that an update of the charging control information only refers to a period of time after the update, and that an update or provisioning of information within the charging control information is preliminary;

a dedicated charging key and/or service identifier may be applied for charging control information; additionally, the dedicated charging key and/or service identifier may be applied for the indication that the charging control information is preliminary;

a recalculation for accounting information process may be executed when receiving the second set of charging control information;

by the indication provided in the first set of charging control information it may be recognized that the first set of charging control information is preliminary, and a different charging may be set based on the first set of charging control information.

Furthermore, according to one aspect of the proposed solution, there is provided, for example, a corresponding computer program product.

By virtue of the proposed solutions, it is possible to provide a charging control by means of which a user service can be charged correctly. In detail, related accounting information can be updated or corrected later in such a manner that the updated or corrected accounting information are considered also for the passed time in which the service was already active. For example, a policy and charging control unit, such as a PCRF, is able to trigger the charging systems to correct accounting information relating to a point in time prior to an update of the charging control information, such as a PCC rule, i.e. for the period in time between the PCC rule activation and the charging related PCC rule update. In other words, the policy and charging control unit may request the charging systems such as the OFCS/OCS via the PCEF to correct accounting information related to a period of time prior to this request. Thus, the correct charging control information, even if provisioned later to the system, can be validly enforced and considered for the whole time of the service usage. Furthermore, at the beginning, i.e. before the information about the correct charging is available, preliminary charging control information is provided for the setup or modification of the communication connection or of a user service running on the communication connection so as to enable a usage of the service requested, for example, as soon as possible, leading to an enhanced service provision for a user.

The above and still further objects, features and advantages of the invention will become more apparent upon referring to the description and the accompanying drawings.

Figure 1:
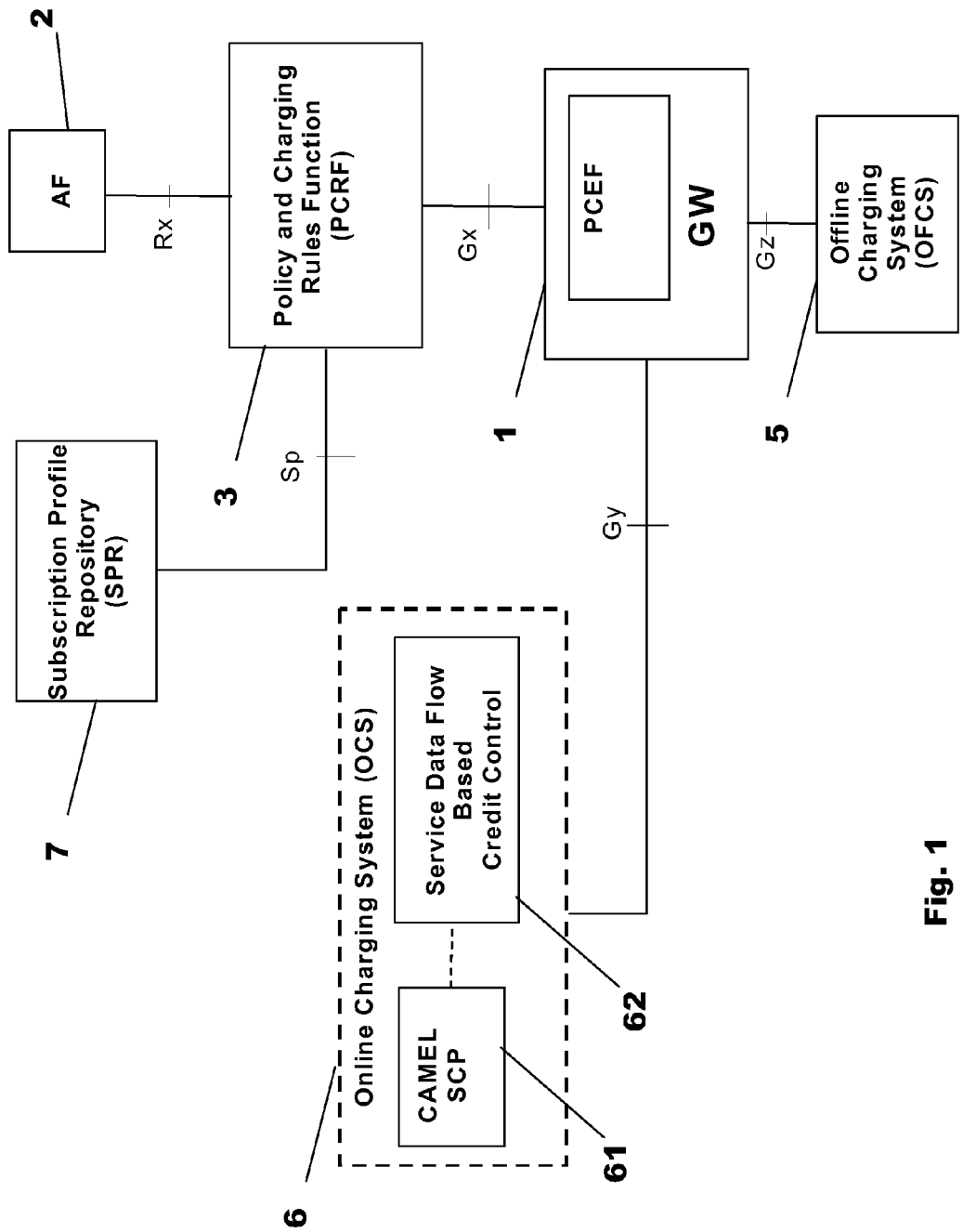
FIG. 1 shows a block circuit diagram illustrating a network structure including a policy and charging control system.

DESCRIPTION OF PREFERRED
EMBODIMENTS

In the following, examples and embodiments of the present invention are described with reference to the drawings. For illustrating the present invention, the examples and embodiments will be described in connection with a 3GPP system where a session to an application function (AF) of an IMS network is to be established or modified. However, it is to be noted that the present invention is not limited to an application in such a system or environment but is also applicable in other network systems, connection types and the like, for example in networks according to 3GPP2 specifications, in Wireless Local Area Networks (WLAN) or the like.

A basic system architecture of a communication network comprising policy and charging system may comprise a commonly known architecture of an IMS network. Such a network architecture comprises several control nodes or CSCF which are SIP servers or proxies fulfilling several roles (such as Interrogating CSCF (I-CSCF), Proxy CSCF (P-CSCF), Serving CSCF (S-SCSF)) and used to process SIP signalling packets in the IMS. Furthermore, charging functionalities like an Offline Charging System (OFCS) or an Online Charging System (OCS) are provided which are used for charging control. Moreover, network nodes like Interconnect Border Control Function (IBCF), Subscription Locator Function (SLF) and Home Subscriber Server (HSS) which are queried through interfaces from an I-CSCF are part of the complete architecture. The general functions and interconnections of these elements are known to those skilled in the art and described in corresponding specifications so that a detailed description thereof is omitted herein. However, it is to be noted that there are provided several additional network elements and signaling links used for a communication connection.

A basic system architecture of a communication network may comprise a commonly known architecture of a wired or wireless access network subsystem. Such an architecture comprises one or more access network control units, radio access network elements, access service network gateways or base transceiver stations, with which a mobile station or terminal device as a subscriber's user equipment is capable of communicating via one or more channels for transmitting several types of data. The general functions and interconnections of these elements are known to those skilled in the art and described in corresponding specifications so that a detailed description thereof is omitted herein. However, it is to be noted that there are provided several additional network elements and signaling links used for a communication connection or a call between end terminals and/or servers.

Furthermore, the network elements and their functions described herein may be implemented by software, e.g. by a computer program product for a computer, or by hardware. In any case, for executing their respective functions, correspondingly used devices, such as PCRF, PCEF, Gateway, charging client nodes, charging server nodes, charging agents and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

FIG. 1 shows an example of a simplified network structure including a policy and charging control system, to which the present invention is applicable.

Reference sign 1 denotes a gateway network element GW as a network control element, such as a Gateway GPRS Support Node (GGSN). The GW or GGSN 1 may comprise a policy and charging enforcement function PCEF 11 encompassing service IP flow detection, policy enforcement and IP flow based charging functionalities. Reference sign 2 denotes an application function of an IMS network, such as a P-CSCF, or another server (or a plurality of servers) or a proxy (or a plurality of proxies) connectable to the network. Reference sign 3 denotes a policy control element, such as a PCRF which coordinates network resources to meet the demands of users that are authorized to use requested services and encompasses policy control decision and IP flow based charging control functionalities. Even though in the following the policy control element 3 is described as a PCRF, it is to be noted that the policy control element may also be a PDF or a RACS. The PCRF 3 allows to use static charging rules and dynamic ruling in addition to rules-based charging.

The GW 1 (the PCEF 11) is connected to the PCRF 3 via a Gx interface, which is Diameter based, for example, and the AF (or P-CSCF) 2 is connected to the PCRF 3 via a Rx interface. Instead of the Diameter protocol, it is also possible to employ another protocol type, dependent on the network architecture.

Reference sign 5 denotes an OFCS. Reference sign 6 denotes an OCS comprising, for example, a CAMEL (Customized Applications for Mobile Enhanced Logic) SCP (Service Control Point) 61 and a service data flow based credit control unit 62. The OFCS 5 is connected to the gateway 1 via a Gz interface and the OCS 6 is connected to the gateway 1 via a Gy interface.

Reference sign 7 denotes a subscription profile repository (SPR) containing all subscriber and subscription related information needed for subscription-based policies and access level policy and charging rules by the policy control element (here the PCRF), which is connected to the PCRF via a Sp interface.

According to the invention, the PCRF requests the charging systems (OFCS/OCS) via the PCEF to correct charging control information related to a period of time prior to this request. In other words, the charging policy can be adjusted also for the time before the adjusting request is sent.

Figure 2:
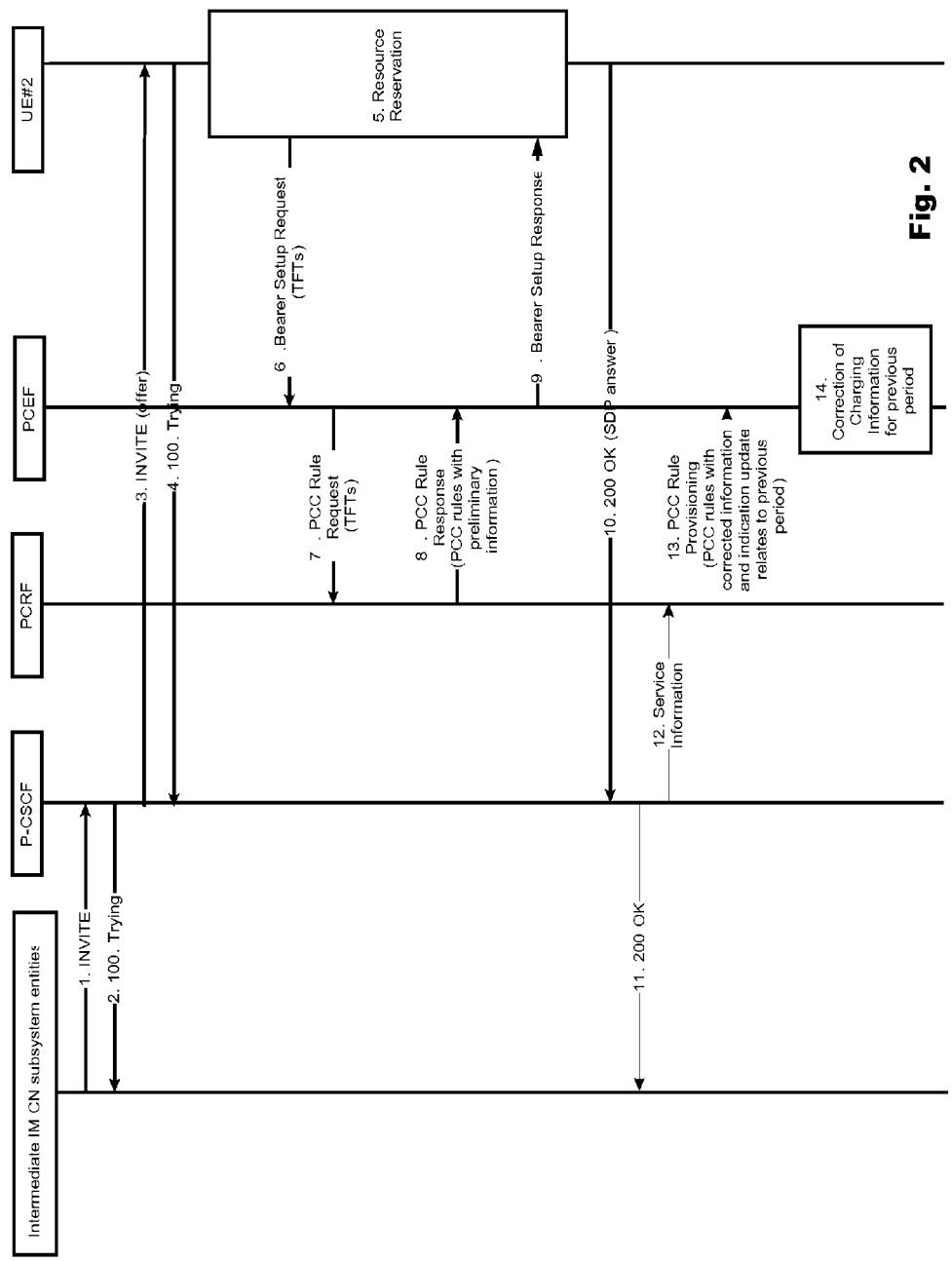
FIG. 2 shows a signaling diagram illustrating an example of a charging control procedure.

An example for a corresponding processing and mechanism is described with reference to FIG. 2. FIG. 2 shows a signalling diagram illustrating a charging control processing in case of an IMS call setup wherein a correction of the charging control information is initiated at the terminating side of the IMS call setup when resources at the originating side are already available.

In steps 1 to 4, several call setup signalling messages are exchanged between the Intermediate IM CN subsystem entities and the P-CSCF (the AF), i.e. an INVITE message at step 1 and a 100 TRYING message at step 2, as well as between the P-CSCF and the UE, i.e. an INVITE message (offer) at step 3 and a 100 TRYING message at step 4.

In a step 5, the UE (at the terminating side of the call) starts a resource reservation process. For this purpose, a bearer setup request with corresponding TFTs is sent to the PCEF in step 6 for requesting a setup or modification of the IP CAN connection, for example. The PCEF informs the PCRF in step 7 by a PCC rule request with the provided TFTs.

According to this example, the PCRF is not able to determine the type of service when the PCEF requests PCC rules due to missing service information from the P-CSCF. Therefore, it determines and provides in step 8 PCC rules, for example preliminary PCC rules, which assume a certain service or a PCC rule for a default service, such as a general Internet traffic. For example, the PCRF sends a PCC rule response comprising PCC rules with an information indicating the preliminary nature of these PCC rules.

For example, the PCRF may not be able to determine the type of service because no service information from an AF (e.g. the P-CSCF) is available at this point of time. Another reason might be that no matching AF service information for the IP CAN session is found via a "binding" process.

According to one example of an embodiment, the PCRF is adapted to inform the charging systems via the PCEF that charging control information in one or several PCC rule(s), e.g. the Rating-Group and/or the Service-Identifier, is preliminary. According to a further example, the PCRF is also adapted to update previously installed PCC rules with this indication, i.e. those PCC rules already installed by the PCEF in a normal way beforehand.

The PCEF receives the (preliminary) PCC rules and processes them. For example, the PCEF sends a Bearer setup response message in step 9 to the UE for answering the request in step 6 so as to enable the UE to complete the resource reservation processing in step 5.

According to one example, the charging systems, like the OFCS and in particular the OCS, are able to determine from the indication that the PCC rules are preliminary. Hence, the charging system is adapted to provide, for example, a credit for the present IP CAN communication connection on the basis of this preliminary status. In other words, the charging system may set, on the basis of the "preliminary" indication, a charging or accounting in a manner different to a normal manner, i.e. when a corresponding request without such a "preliminary" indication would be received. For example, even in case the user requesting the user service does not have a sufficient "normal" balance for some user services, the charging system provides a credit even though the service as such is not known at this point of time. Furthermore, the charging system learns from this "preliminary" indication that a later correction of the charging control information and thus of accounting information will be executed. Hence, for example, a specific charging key/service identifier (or a new information element) tells the charging system that the charging can not be done in a service specific way. That also means that the accounting information that will be collected has to be re-calculated later on when a service specific charging key arrives at the charging system. This will be explained below.

In step 10, the UE sends a 200 OK message to the P-CSCF which message includes the SDP answer. The P-CSCF responds, after receiving the SDP answer, to the Intermediate IM CN subsystem entities (i.e. to the INVITE message in step 1) in step 11 and provides service information related to the IMS call to the PCRF in step 12.

Thus, when receiving information about services from an AF (the P-CSCF), the PCRF is able to determine the type of service. The PCRF processes the received information and compares, for example, this service information with information about ongoing IP CAN sessions and already installed PCC rules.

According to one example, once the PCRF is able to determine the type of service, the PCRF updates the PCC rules accordingly (for instance by provisioning a service specific Rating-Group and/or a Service-Identifier). Furthermore, an information element or the like is included which indicates that the update, i.e. the updated or new PCC rules, refers to the period of time prior to this update, i.e. to the time before a corresponding update request is received by, for example, the PCEF. According to one example, the period of time in question may start with the time when the PCC rule has been installed by the PCEF.

According to a further example, the period of time in question may start with the time the PCC rule has been updated/ added with an indication that the information is preliminary.

In order to inform the PCEF about the result of the processing of the service information and the achieved (updated) PCC rules, the PCRF sends in step 13 a message to the PCEF for PCC rule provisioning. This signalling may comprise the PCC rules with the corrected content and an indication that this update relates also to a previous period of time.

Upon reception of the updated PCC rule by the message in step 13, the PCEF initiates a correction of the charging control information in step 17. According to one example, the PCEF applies the updated information in the interaction with the charging systems and forwards the information that the update refers to the period of time prior to this update request to the charging subsystem.

As described above, by the "preliminary" indication, the charging system may know that it has to provide accounting which is to be corrected later on. That means that the accounting information that will be collected has to be re-calculated later on when a service specific charging key arrives at the charging system. This may be effected by means of the information that the update refers to the period of time prior to this update request to the charging subsystem. Alternatively, when the charging systems know by means of the "preliminary" indication that a correction has to be effected, the correction/re-calculation may be triggered by the receipt of another charging control information set being different to that received at the beginning (the first "preliminary" PCC rules).

According to one example, depending of the charging mode (online/offline), the PCEF may terminate the old accounting process and starts a new accounting process in case of offline charging by writing appropriate charging detail records (CDRs) that include the information that the update refers to the period of time prior to the moment when the CDRs are written. Signalling corresponding to these measures is exchanged then with the OFCS. In a further example, the PCEF may ask for a new credit from the OCS in case of online charging. In this connection, the PCEF may be adapted to give back any remaining credit for the (previously valid) charging session. The information that the update refers to the period of time prior to the moment when the CDRs are written may be forwarded again.

By means of this, the charging systems are enabled to correct charging related information for the period in time prior to the update request.

For example, the OFCS may take this information from the charging detail records (CDRs).

On the other hand, the OCS may correct the user account based on the previously consumed units and the new charging rate, for example. For instance, the OCS may calculate the time the previously unknown service was running by dividing the preliminary previously consumed units with the applied rate for the unknown service. The OCS may then calculate the correct amount of consumed units by multiplying that time with the new charging rate for the now known service. The OCS then corrects the user balance with the difference between the preliminary previously consumed units and the correct amount of consumed units.

By means of the measures discussed above, a policy and charging control function unit, such as a PCRF, is able to request the charging systems (OFCS/OCS), for example via the PCEF, to correct accounting information related to a period of time prior to this request. Hence, the accounting information can be updated so that the service as a whole can be charged correctly.

In the following, further modifications of the preceding examples are described.

In a first modification, the same updated information in the PCC rule may apply both for the time prior to the update and for the time after the update of the PCC rule. However, according to a further example, the updated information may apply only for the time prior to the update.

In a further modified example, the information that the charging related control information is preliminary, as provided with the massage in step 8 of FIG. 2, for example, is encoded with a dedicated information element, such as a dedicated value of the Rating-Group and/or the Service-Identifier. This is in particular useful when the charging system has to recognize the "preliminary" character of the first PCC rules (leading to a provision of a credit, for example) and the possibility of a later correction/adjustment of the accounting procedure. In the further process, when the charging subsystem (OCS, OFCS) first obtains this dedicated information element and then obtains later or within a predetermined time another corresponding information element, such as another value for the Rating-Group and/or the Service-Identifier, the charging subsystem is adapted to replace that (first received) dedicated value with the other (later received) value, for example for the purpose of calculating the charge for the previous time when that dedicated value was applicable. It is to be noted that a corresponding encoding may be transparent to a relay element between PCRF and charging subsystems, like the PCEF, and a corresponding encoding may be effected on the basis of existing interface protocols, like the Gy and Gz protocol. The charging systems are then configured to correct the previously gathered accounting information once, for example, a change of such a specific Rating-Group value occurs.

In a further modification of the examples described above the proposed procedures regarding the information about the preliminary and/or updated rules are implemented by using an encoding in the interface to the respective element, such as in the Gx interface related protocol (see FIG. 1). In detail, a new information portion, such as a new attribute value pair (AVP), for example a new Diameter AVP may be added at a suitable place, for example either in the Charging-Rule-Install, or in the Charging-Rule-Definition AVP. According to this example, the AVP may for instance be of an enumerated type and have a value to indicate that an update of the PCC rule refers both to the period of time prior to the update and the period of time after the update, and another (second) value to indicate that an update of the PCC rule only refers to a period of time after the update. A third value may be also added which may be used, for example, to indicate that an update or provisioning of information within the PCC rule is preliminary. It is to be noted that a corresponding encoding is used in this modification also for other interface protocols, such as for the Gy and Gz protocols. In addition, it is to be noted that the information portions, such as the AVP, may be the same for different of the interfaces, such as for the Gx and Gy.

Figure 3:
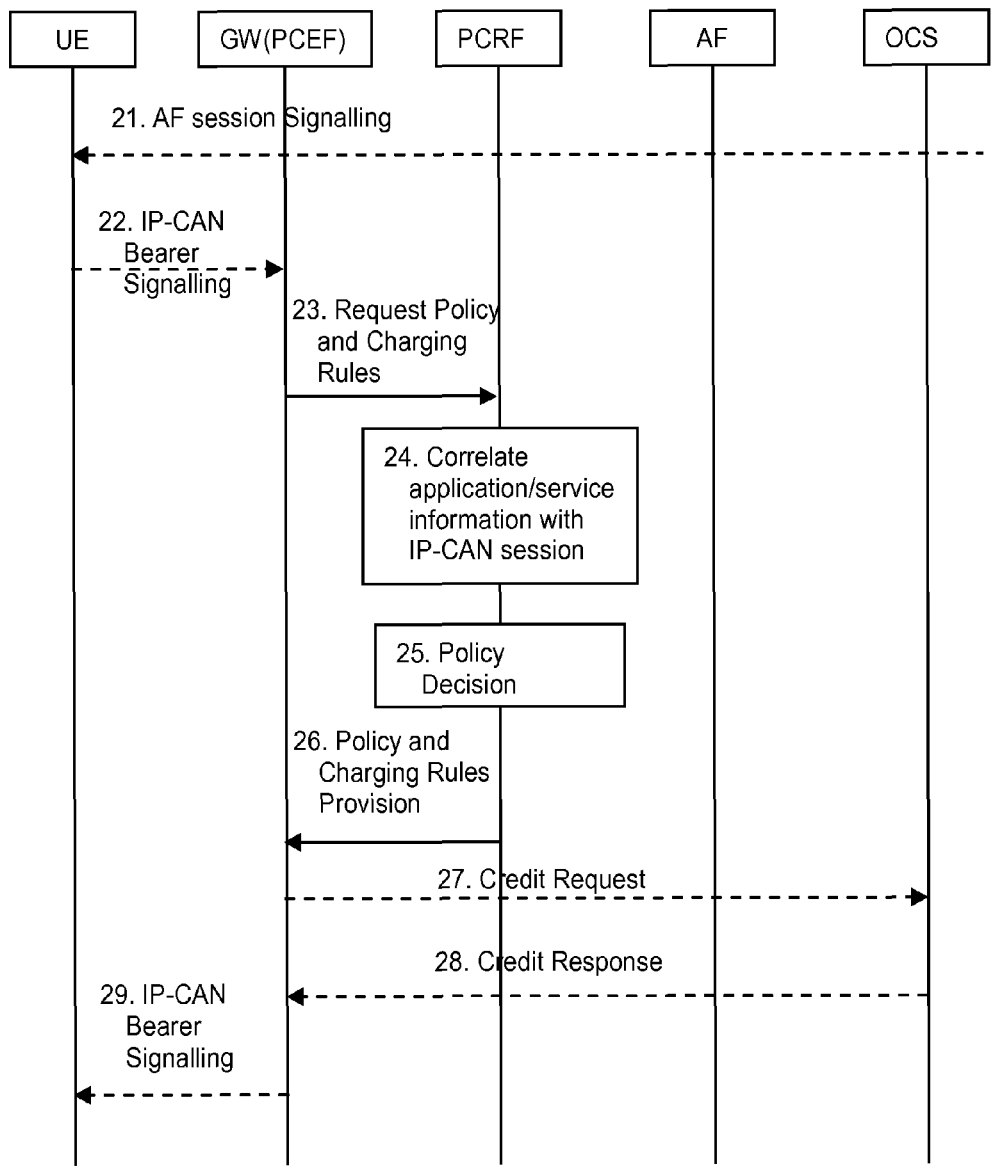
FIG. 3 shows a signaling diagram illustrating a further example of a charging control procedure.
Figure 4:
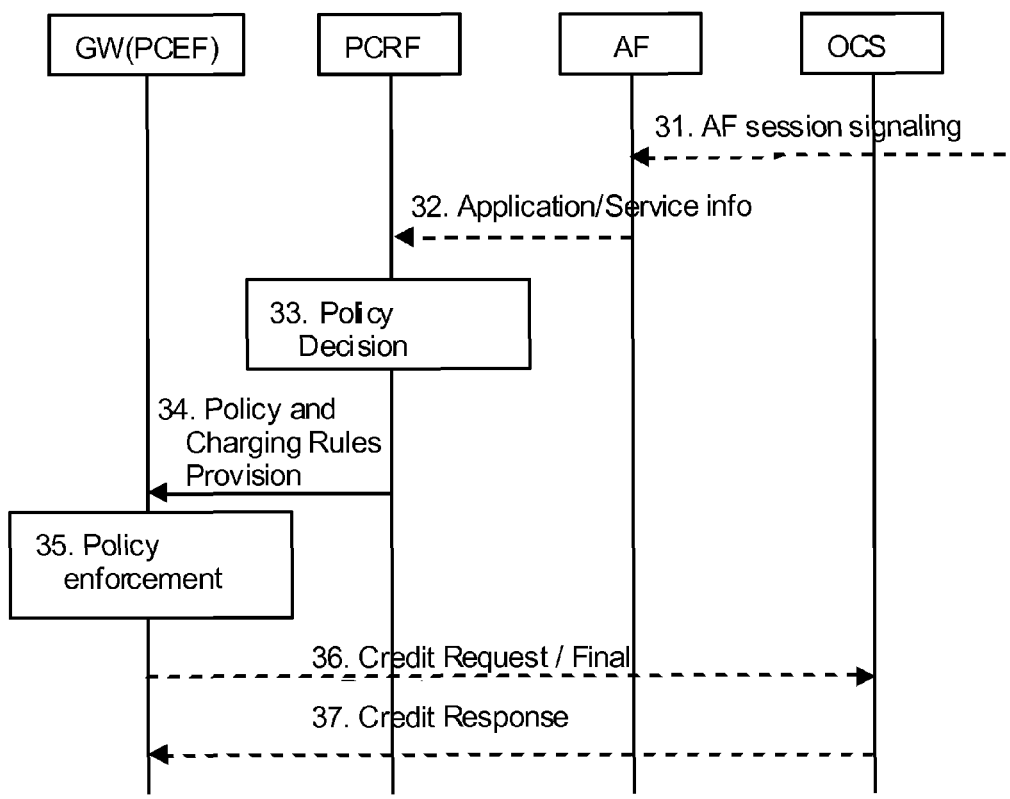
FIG. 4 shows a signaling diagram illustrating a further example of a charging control procedure.

Next, the flow charts according to FIGS. 3 and 4 are described. In FIG. 3, an example of a charging control signalling and processing is illustrated wherein in particular the processing regarding the provisioning of the preliminary charging control information is explained. On the other hand, in FIG. 4 the example of charging control signalling and processing is further illustrated wherein in particular the processing regarding the provisioning of the updated charging control information is explained.

According to FIG. 3, in step 21, the UE decides to initiate a session or may receive an AF session signalling, e.g. an SIP INVITE indicating an IMS session establishment.

Then, in step 22, the UE initiates a request for an IP-CAN Bearer establishment or modification to get the resources for the AF session (step 22 corresponds to steps 5 and 6 of FIG. 2, for example). This request may contain, for example, QoS and packet filter parameters and is sent to the GE (PCEF).

In step 23, the PCEF determines that the PCC interaction is required and sends in step 24 the PCC Rules request to the PCRF. This request may contain the QoS and packet filter parameters.

In step 25, the PCRF correlates the received request for PCC Rules, i.e. the information contained therein, with IP-CAN session and service information available at the PCEF. According to this example, the PCRF does not find any applicable service information for the packet filter parameters originally provided by the UE. Then, the PCRF makes a corresponding authorization and policy decision and may generate a PCC rule (or PCC rules) based on the UE provided QoS and packet filter parameters. Furthermore, the PCRF may apply a dedicated charging key for this PCC rule.

In step 26, the PCRF sends the decision containing the PCC rule to the PCEF. The GW(PCEF) enforces the decision and installs the PCC rule received.

Next, in a step 27, the charging subsystem may be informed in correspondence with the present charging mode. For example, in case online charging is applicable, the PCEF may request credit for the charging key from the OCS. On the other hand, in case offline charging is applicable, the PCEF uses the charging key for the accounting. If the OCS was contacted in step 27, the OCS provides the credit information to the PCEF in step 28.

In step 29, the GW(PCEF) may acknowledge or reject any IP-CAN bearer signalling received in step 22. The IP-CAN bearer establishment or modification is accepted if at least one PCC rule is active for the IP-CAN bearer and in case of online charging credit was not denied by the OCS. Otherwise, the IP-CAN bearer establishment or modification may be rejected.

According to FIG. 4, in step 31, the AF (e.g. P-CSCF) receives an AF session signalling containing service information that is required for the authorization at the PCRF, e.g. an SIP 200 OK containing SDP information.

In step 32, the AF provides the service information to the PCRF. The PCRF may store the service information.

In step 33, the PCRF processes the received information, for example, it correlates the service information with the already installed PCC Rule by comparing the packet filter parameters. The PCRF now makes the authorization and policy decision for the service, based on the now available information, and updates the relevant PCC rule parameters, especially the charging key according to the service.

In step 34, the PCRF sends the decision containing the PCC rule modification to the PCEF. After receiving this message, the PCEF enforces the decision and modifies the PCC rule in step 35.

In step 36, the charging system may be informed. In case, for example, online charging is applicable, the PCEF request credit for the new charging key from the OCS and returns the remaining credit for the old charging key to the OCS. On the other hand, in case offline charging is applicable, the PCEF closes the accounting for the old charging key and re-starts the accounting with the new charging key.

In step 37, in case the OCS was involved in step 36, the OCS applies the new charging key to re-calculate the charge for the service. The OCS provides the credit information to the PCEF.

In the following, a further example of a charging control is described. The elements described and used in the following example may be based on those depicted in FIG. 1.

When an UE starts resource reservation for an IMS session, i.e. the establishment or modification of bearers, the PCC functionality has not yet received the corresponding service information. Thus, the PCRF 3 is asked to authorize new/modified bearers without having any information about the new IMS session available.

The PCRF 3 may be configured to allow the UE to request enhanced QoS for services not known to the PCRF 3. In this case, the PCRF 3 creates corresponding PCC rules as configured by the operator for authorizing this request.

According to this example, the terminating P-CSCF 2 may send the available service information to the PCRF 3 already after receiving an SDP offer. The PCRF 3 may provision PCC rules towards the PCEF 11 to enable pre-authorization for a terminated IMS session setup with UE initiated resource reservation. PCC rules and bearer binding are updated after the reception of an SDP answer.

In detail, if the PCRF 3 receives a request for PCC rules for an IP CAN session from the PCEF 11 while no suitable authorized PCC rules are configured in the PCRF 3 or can be derived from service information provisioned by an AF 2, the PCRF checks the set of services the user is allowed to access for this access point name (APN).

If the user is not allowed to access AF session based services, the PCRF 3 may check whether the user is allowed to request resources for services not known to the PCRF 3 and whether the requested QoS can be authorized. If this is the case, the PCRF 3 may provide a PCC rule to authorize the UE requested QoS and TFT that were received as part of the request for PCC rules. The service data flow description may be derived from the TFT. The QoS class identifier (QCI) of the PCC rule may be set to the value requested by the UE while the bitrate parameters may be downgraded according to PCC internal policies. If the user is not allowed to request resources for services not known to the PCRF 3, the PCRF 3 may reject the request.

On the other hand, if the user is allowed to access AF session based services, the PCRF 3 may authorize the requested QoS for a timer supervised grace period to wait for AF service information. If an AF session bound to the same IP CAN session is ongoing and only preliminary service information was received within this AF session, the PCRF 3 may authorize the requested QoS for a timer supervised period.

It is to be noted that this scenario may for instance be encountered for a UE terminated IMS session establishment or modification with UE initiated resource reservation. If the PCRF 3 does not authorize a request for PCC rules in this scenario, the IMS session setup can fail. Furthermore, it is to be noted that during the grace period, the QoS requested by the UE needs to be authorized even if the user is not allowed to request for resources for services not known to the PCRF 3 or if the requested QCI is not allowed for services not known to the PCRF 3 as it is not clear at this point in time whether the UE resource request belongs to an AF session or to a service not known to the PCRF 3.

If the preliminary service information is insufficient to construct appropriate PCC rules, or no preliminary service information is available, the PCRF 3 may provide preliminary PCC rules to authorize the UE requested QoS and TFT. Therefore, the preliminary PCC rules may contain wildcarded flow description or flow description derived from possible TFTs received as part of the request for PCC rules. The PCRF 3 may apply a dedicated charging key value to indicate to the charging subsystem that the charging key is preliminary and may be corrected later on.

It is to be noted that with the dedicated charging key, the PCRF 3 instructs the charging subsystem to recalculate the applicable charge for the time when the dedicated charging key value was applied once the dedicated charging key value is replaced with some other value in a new provisioning of PCC rules. For example, if online charging applies, Session Charging with Unit Reservation (SCUR) may be used. When the charging key changes, the PCEF 3 will return initially reserved credit units and the OCS 6 may then recalculate the consumed credit units applying the rate derived from the new other charging key value and update the users credit accordingly. Furthermore, a preliminary PCC rule may be a normal PCC rule containing preliminary information.

In case the PCRF 3 receives AF service information while the timer-supervised grace period is running, the PCRF 3 may derive authorized PCC rules from this service information and update or replace the preliminary PCC rules that were previously provided for the UE requested QoS and TFT, for instance by choosing service specific QoS parameters and charging keys.

It is to be noted that the dedicated preliminary charging key value that was previously provided by the PCRF 3 may instruct the charging subsystem to recalculate the applicable charge when the new service specific charging key is provided. The recalculation covers the time when the previous dedicated charging key value was active. The new service specific charging key is applied from that time onwards.

On the other hand, in case the timer expires and the PCRF 3 has not received any AF service information, the PCRF 3 may downgrade or revoke the authorization for the preliminary PCC rules previously provided for the UE requested QoS and TFT in accordance with the policy for non AF-session based services. For example, the PCRF 3 may adjust the charging keys within the PCC rules and should downgrade the authorized QoS to the allowed value for the services not known to the PCRF 3, if required. If the PCRF 3 performs the bearer binding, the PCRF 3 may also adjust or revoke the authorization for a corresponding dedicated IP CAN bearer.

For the purpose of the present invention as described herein above, it should be noted that

- an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- an access network may be any device, apparatus, unit or means by which a station, entity or other user equipment may connect to and/or utilize services offered by the access network; such services include, among others, data and/or (audio-) visual communication, data download etc.;
- a mobile station (or user equipment) may be any device, apparatus, unit or means by which a system user may experience services from an access network such as a mobile phone, personal digital assistant PDA, or computer;
- method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;
- devices, apparatuses, units or means can be implemented as individual devices, apparatuses, units or means, but this does not exclude that they are implemented in a distributed fashion throughout the system, as long as the functionality of the device, apparatus, unit or means is preserved,
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

As described above, there is proposed a charging control in which a policy and charging control function provides first (preliminary) charging control information, such as PCC rules, when the communication connection is set up or modified. Then, service information can be retrieved leading to an updated set of charging control information. The policy and charging control function provides then the updated charging control information for enforcement, wherein the charging system is informed about both the preliminary nature of the first charging control information and the validity of the second charging control information for a time before the update, i.e. before the transmission of the second charging control information. The charging system can use this updated charging control information and knows that it has to replace the former charging control information, so that the charging procedure can be corrected accordingly. Thus, charging of a service running on the communication connection on the basis of correct charging control information is possible over the complete time the service is running Although the present invention has been described herein before with reference to particular embodiments thereof, the present invention is not limited thereto and various modifications can be made thereto.

The invention claimed is:

1. An apparatus comprising:
at least one processor;
memory storing a program of instructions;
wherein the memory storing the program of instructions is configured to, with the at least one processor, cause the apparatus to at least:
provide, in response to a request for charging control information for a service running on a communication connection, first charging control information including an indication indicating that the first charging control information is preliminary and instructing recalculation of an applicable charge when a further indication is provided, wherein the further indication is specific to the service;
receive a service information regarding the service running on the communication connection, and adjust charging control information in accordance with the service information received, and provide second charging control information, wherein the second charging control information includes the further indication, and wherein the further indication indicates that the second charging control information is valid beginning at provision of the first charging control information, with validity continuing at least until the provision of the second charging control information.

2. The apparatus according to claim 1, wherein the apparatus is further configured to determine services allowed to a user of the communication connection, wherein the first charging control information is based on the result of the determination.

3. The apparatus according to claim 1, wherein the charging control information comprises at least one policy and/or charging rule.

4. The apparatus according to claim 1, wherein the indication that the first charging control information is preliminary is encoded with a dedicated charging key value included in the first charging control information, and/or wherein the other indication comprises a charging key value specific to the service.

5. An apparatus comprising:
at least one processor;
memory storing a program of instructions;
wherein the memory storing the program of instructions is configured to, with the at least one processor, cause the apparatus to at least:
receive first charging control information for a service running on a communication connection, wherein an indication is provided in the first charging control information indicating that the first charging control information is preliminary and instructing recalculation of applicable charges when another indication is provided, wherein the other indication is specific to a service;
receive second charging control information for the service, including the other indication indicating that the second charging control information is valid beginning at provision of the first charging control information, with validity continuing at least until the provision of the second charging control information;
process the received charging control information and enforce corresponding charging rules for the service.

6. The apparatus according to claim 5, wherein the apparatus is further caused to configure for transmission a request for charging control information for a communication connection.

7. The apparatus according to claim 5, wherein the charging control information comprises at least one policy rule and/or charging rule.

8. The apparatus according to claim 5, wherein the apparatus is further caused to configure for transmission, to a charging subsystem, information regarding the received charging control information, wherein the information indicates at least one of that the charging control information is preliminary or that the charging control information is valid beginning at provision of the first charging control information, with validity continuing at least until the provision of the second charging control information.

9. The apparatus according to claim 5, wherein the indication that the first charging control information is preliminary is encoded with a dedicated charging key value included in the first charging control information, and/or-wherein the other indication comprises a charging key value specific to the service.

10. The apparatus according to claim 5, wherein the apparatus is caused to process the received charging control information and to effect a charging procedure for charging a service running on the communication connection corresponding to charging rules for the service, wherein the recalculation is related to accounting information on the basis of the second charging control information and is effected for a time before the second charging control information is received.

11. A method comprising:
controlling a processor to, in response to a request for charging control information for a service running on a communication connection, cause an apparatus to provide first charging control information including an indication indicating that the first charging control information is preliminary and instructing recalculation of applicable charge when another indication is provided, wherein the other indication is specific to the service;
at the apparatus, receiving service information regarding the service running on the communication connection;
controlling the processor to cause the apparatus to adjust charging control information in accordance with the service information received; and
controlling the processor to cause the apparatus to provide second charging control information, wherein the second charging control information includes the other indication indicating that the second charging control information is valid beginning at provision of the first charging control information, with validity continuing at least until the provision of the second charging control information.

12. The method according to claim 11, wherein the indication that the first charging control information is preliminary is encoded with a dedicated charging key value included in the first charging control information, and/or wherein the other indication comprises a charging key value specific to the service.

13. A method comprising:
configuring at least one processor to control an apparatus to at least:
transmit a request for charging control information for a communication connection:
receive first charging control information, wherein an indication is provided in the first charging control information indicating that the first charging control information is preliminary and instructing to recalculate applicable charge when a further indication is provided, wherein the further indication is specific to the service,
receive second charging control information including the further indication indicating that the second charging control information is valid beginning at provision of the first charging control information, with validity continuing at least until the provision of the second charging control information: and
process the received charging control information and enforcing corresponding charging rules for the communication connection.

14. The method according to claim 13, wherein the indication that the first charging control information is preliminary is encoded with a dedicated charging key value included in the first-charging control information, and/or wherein the other indication comprises a charging key value specific to the service.

15. An apparatus, comprising:
one or more processors; and
one or more memories including computer program code, the one or more memories and the computer program code configured, with the one or more processors, to cause the apparatus to perform at least:

receiving a request for charging control information for a service running on a communication connection, providing first charging control information including an indication indicating that the first charging control information is preliminary and instructing to recalculate applicable charge when another indication is provided, and receiving a service information regarding the service running on the communication connection, and adjusting charging control information in accordance with the service information received, and providing second charging control information including the further indication, and wherein the further indication indicates that the second charging control information is valid beginning at provision of the first charging control information, with validity continuing at least until the provision of the second charging control information, wherein the other indication is specific to the service.

16. The apparatus according to claim 15, wherein the indication that the first charging control information is preliminary is encoded with a dedicated charging key value included in the first charging control information, and/or wherein the other indication comprises a charging key value specific to the service.

* * * * *